Dec. 2, 1924.
W. SEIZ
1,517,866
PROCESS FOR REGULATING THE SPEED OF AN ELECTRIC MOTOR CASCADE
Filed June 27, 1921
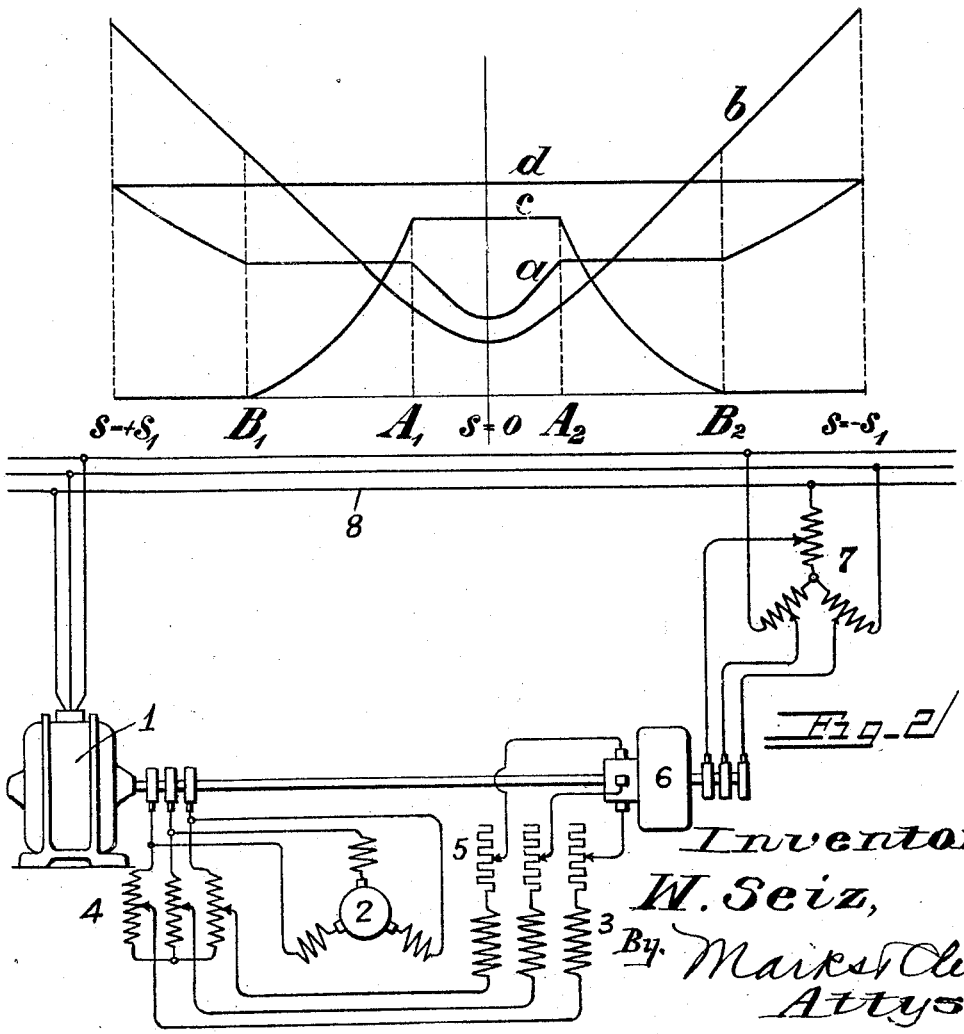

Patented Dec. 2, 1924.

1,517,866

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

PROCESS FOR REGULATING THE SPEED OF AN ELECTRIC MOTOR CASCADE.

Application filed June 27, 1921. Serial No. 480,855.

*To all whom it may concern:*

Be it known that I, WALTER SEIZ, a citizen of the German Realm, residing at No. 25 Mellingerstrasse, Baden, Switzerland, have invented certain new and useful Improvements in the Process for Regulating the Speed of an Electric Motor Cascade, of which the following is a specification.

When a cascade consisting of an induction motor and a shunt commutator machine is to be driven at speeds of rotation in the immediate neighbourhood of synchronism, then in any case the ohmic voltage drop of the exciting current of the commutator machine must be furnished from the supply circuit through a frequency transformer.

In this connection, however, there is the risk of unstable running if the resistance of the exciting circuit is of the same magnitude as the reactance when the speed of rotation approaches synchronism.

In order to avoid this drawback, it has heretofore been proposed to provide an adjustable resistance in the exciting circuit (the circuit supplied from the frequency converter) of sufficient magnitude that at speeds near synchronism, the ohmic drop therein is (1) enough greater than the reactance drop to assure stable operation, and (2) as large as the ohmic drop in the exciting circuit with maximum excitation and with the adjustable resistance short circuited, whereby by varying this resistance, the ohmic voltage of the exciting circuit may be maintained constant throughout the range of regulation.

When a comparatively wide range of regulation is desired, the amount of adjustable resistance in the exciting circuit for regulating purposes is materially greater than that needed to assure stable operation near synchronous speed, consequently, with such an arrangement, the ohmic drop in the exciting circuit is greater than necessary except at speeds near the extreme upper and lower limits of regulation and it is the object of my invention to provide a system wherein this loss is eliminated without hindering stable operation at speeds near synchronism and without curtailing the desired considerable range of regulation.

In carrying my invention into effect, I provide a resistance in the exciting circuit of sufficient magnitude to assure stable operation at speeds near synchronism and provide a variable voltage transformer between the supply line and the frequency converter for regulating purposes. By this arrangement, the resistance in the exciting circuit at speeds near synchronism needs to be no greater than that required for stable operation, while for regulating purposes, the increase in exciting current is obtained by increasing the voltage impressed upon the frequency transformer by means of the adjustable transformer. Thus, an abnormal ohmic drop in the exciting circuit is avoided. The adjustable feature of the resistance in the exciting circuit is retained since this resistance may safely be reduced to regulate the speed away from synchronism and for still greater regulating ranges, the voltage impressed upon the frequency converter is increased.

The features of my invention which I believe to be novel and patentable, will be pointed out in the claim appended hereto. For a better understanding of my invention, reference is made in the following description to the accompanying drawings in which Fig. 1 is a vectoral illustration of the regulating factors to be considered; and Fig. 2 is a representative grouping of the apparatus to which my invention is applicable. Referring first to Fig. 2, 1 is the main induction motor to be regulated; 2 the cascade commutator machine; 3 the shunt field of machine 2 which field is in series with the exciting circuit supplied from the frequency converter represented at 6; 5 represents the adjustable resistance of the exciting circuit; 4 the usual adjustable series transformer, and 7 the adjustable potential transformer through which the frequency converter is supplied from the line 8 and by means of which the voltage impressed upon the frequency converter is effected. The adjustable series transformer 4 is not necessary but is preferably provided in order that the system may be more closely adjusted for different loads. It is customary to provide separate excitation to overcome the inductive drop in the exciting circuit. Since such additional means constitutes no part of my present invention, it has not been illustrated or described, since to do so would only complicate the description without adding anything of value thereto.

Referring now to Fig. 1 with the abscissa represented as the slip (s) with zero slip at the central point, the ordinate represents for curve (a) the voltage of the frequency transformer 6, for curve (b) the exciting current, for curve (c) the amount of regulating resistance at 5, and for curve (d) the voltage of the frequency transformer in a system where no adjustable auto transformer 7 is provided and the regulation is obtained entirely by additional resistance in the exciting circuit. In connection with this figure it should be kept in mind that the function of the frequency transformer is to supply only that voltage necessary to overcome the ohmic drop of the exciter circuit and not the inductive drop, consequently, the inductive drop of the exciter circuit should not be and is not considered here.

In Fig. 1, $A_1$—$A_2$ represents the range of speed regulation close to synchronism wherein there is risk of unstable operation. In the range $B_1$—$A_1$ and $B_2$—$A_2$, the ohmic voltage drop and the exciting current is regulated by the adjustable resistance 5 of Fig. 2 and beyond $B_1$ and $B_2$ where the regulating resistance has been reduced to zero, the regulation is obtained by regulating the voltage of the transformer 7.

In previous arrangements, where the voltage of the frequency transformer was maintained constant as represented by curve (d), and the regulation obtained by the regulation of a much higher resistance in the exciting circuit than is here necessary, considerable unnecessary losses were present, the extent of which may be represented by the area enclosed by the curves (a) and (d).

The improved method of my invention is applicable for over-synchronous as well as under-synchronous operation with the frequency converter remaining in circuit.

What I claim is:—

The method of regulating the speed of a cascade composed of an induction motor and a shunt commutator machine, the latter having an exciting circuit supplied from a frequency converter, wherein, in the neighborhood of synchronism, there is inserted in the exciting circuit a constant resistance of such an amount that it assures the stable running of the motor aggregate, and wherein the voltage of the frequency transformer supplying excitation to the commutator machine is kept always equal or approximately equal to the ohmic voltage drop in the exciting circuit, characterized by the feature that at speeds of rotation which are more distant from synchronism the said resistance is varied in such a manner that an approximately constant ohmic voltage drop will occur in the exciting circuit throughout this part of the range of regulation and that beyond the particular speeds of rotation at which the additional resistance becomes nil, the voltage of the frequency transformer is again increased in accordance with the ohmic voltage drop that increases with the exciting current.

In testimony whereof I have signed my name to this specification.

Dr. Ing. WALTER SEIZ.